(12) United States Patent
Sumi et al.

(10) Patent No.: US 10,033,216 B2
(45) Date of Patent: Jul. 24, 2018

(54) INITIAL CHARGING METHOD AND PRODUCTION METHOD FOR LITHIUM-ION BATTERY

(71) Applicant: TOYOTA JIDOSHA KABUSHIKI KAISHA, Toyota-shi, Aichi-ken (JP)

(72) Inventors: Tomohide Sumi, Nagoya (JP); Yoshio Matsuyama, Nisshin (JP); Yosuke Shimura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 142 days.

(21) Appl. No.: 15/018,216

(22) Filed: Feb. 8, 2016

(65) Prior Publication Data

US 2016/0233691 A1     Aug. 11, 2016

(30) Foreign Application Priority Data

Feb. 10, 2015 (JP) .................................. 2015-024391

(51) Int. Cl.
| | |
|---|---|
| H02J 7/04 | (2006.01) |
| H02J 7/16 | (2006.01) |
| H02J 7/00 | (2006.01) |
| H01M 4/36 | (2006.01) |
| H01M 4/587 | (2010.01) |
| H01M 10/0525 | (2010.01) |
| H01M 10/0567 | (2010.01) |
| H01M 10/44 | (2006.01) |

(52) U.S. Cl.
CPC ............. *H02J 7/007* (2013.01); *H01M 4/366* (2013.01); *H01M 4/587* (2013.01); *H01M 10/0525* (2013.01); *H01M 10/0567* (2013.01); *H01M 10/446* (2013.01); *H02J 7/00* (2013.01); *H02J 7/0052* (2013.01); *H01M 2300/004* (2013.01)

(58) Field of Classification Search
CPC ...................................................... H02J 7/007
USPC ......................................................... 320/162
See application file for complete search history.

(56) References Cited

U.S. PATENT DOCUMENTS

| | | |
|---|---|---|
| 2002/0034678 A1 | 3/2002 | Shibuya et al. |
| 2013/0335009 A1 | 12/2013 | Katsumata et al. |
| 2015/0004474 A1 | 1/2015 | Lee et al. |
| 2015/0340885 A1* | 11/2015 | Baek ..................... H02J 7/0013 320/128 |

FOREIGN PATENT DOCUMENTS

| | | |
|---|---|---|
| JP | 2001-325988 A | 11/2001 |
| JP | 2002-208440 A | 7/2002 |
| JP | 2002203609 A | 7/2002 |
| JP | 2004-228010 A | 8/2004 |
| JP | 2011-108550 A | 6/2011 |
| JP | 2012-227035 A | 11/2012 |
| JP | 2014-002055 A | 1/2014 |
| JP | 2015-228289 A | 12/2015 |
| KR | 10-2015-0004271 A | 1/2015 |

* cited by examiner

*Primary Examiner* — Edward Tso
*Assistant Examiner* — Ahmed Omar
(74) *Attorney, Agent, or Firm* — Sughrue Mion, PLLC

(57) ABSTRACT

An initial charging method for a lithium-ion battery according to this embodiment includes preparing a cell having a positive electrode, a negative electrode, and an electrolyte and charging the cell by using voltages based on the amount of change in a capacity of the cell per unit voltage as a specified voltage.

5 Claims, 12 Drawing Sheets

FIG. 3

| CHARGING PATTERN | | FIRST EMBODIMENT | SECOND EMBODIMENT |
|---|---|---|---|
| FIRST PATTERN | CURRENT RATE | 5C | |
| | VOLTAGE | V1 | |
| | CONTROL CONDITION | CONSTANT CURRENT CONSTANT VOLTAGE (TERMINATION CURRENT 0.25 C) | |
| SECOND PATTERN | CURRENT RATE | 5C | |
| | VOLTAGE | V2 | |
| | CONTROL CONDITION | CONSTANT CURRENT CONSTANT VOLTAGE (TERMINATION CURRENT 0.25 C) | |
| THIRD PATTERN | CURRENT RATE | 5C | 0.25C |
| | VOLTAGE | V3 | V3 |
| | CONTROL CONDITION | CONSTANT CURRENT CONSTANT VOLTAGE (TERMINATION CURRENT 0.25 C) | CONSTANT CURRENT |
| FOURTH PATTERN | CURRENT RATE | 5C | 5C |
| | VOLTAGE | V4 | V4 |
| | CONTROL CONDITION | CONSTANT CURRENT CONSTANT VOLTAGE (TERMINATION CURRENT 0.25 C) | CONSTANT CURRENT CONSTANT VOLTAGE (TERMINATION CURRENT 0.25 C) |

FIG. 8

| CHARGING PATTERN | | THIRD EMBODIMENT | FOURTH EMBODIMENT |
|---|---|---|---|
| FIRST PATTERN | CURRENT RATE | 5C | |
| | VOLTAGE | V1 | |
| | CONTROL CONDITION | CONSTANT CURRENT CONSTANT VOLTAGE (TERMINATION CURRENT 0.25 C) | |
| SECOND PATTERN | CURRENT RATE | 5C | 0.25C |
| | VOLTAGE | V2 | V2 |
| | CONTROL CONDITION | CONSTANT CURRENT CONSTANT VOLTAGE (TERMINATION CURRENT 0.25 C) | CONSTANT CURRENT |
| THIRD PATTERN | CURRENT RATE | 5C | 5C |
| | VOLTAGE | V3 | V3 |
| | CONTROL CONDITION | CONSTANT CURRENT CONSTANT VOLTAGE (TERMINATION CURRENT 0.25 C) | CONSTANT CURRENT CONSTANT VOLTAGE (TERMINATION CURRENT 0.25 C) |

FIG. 9

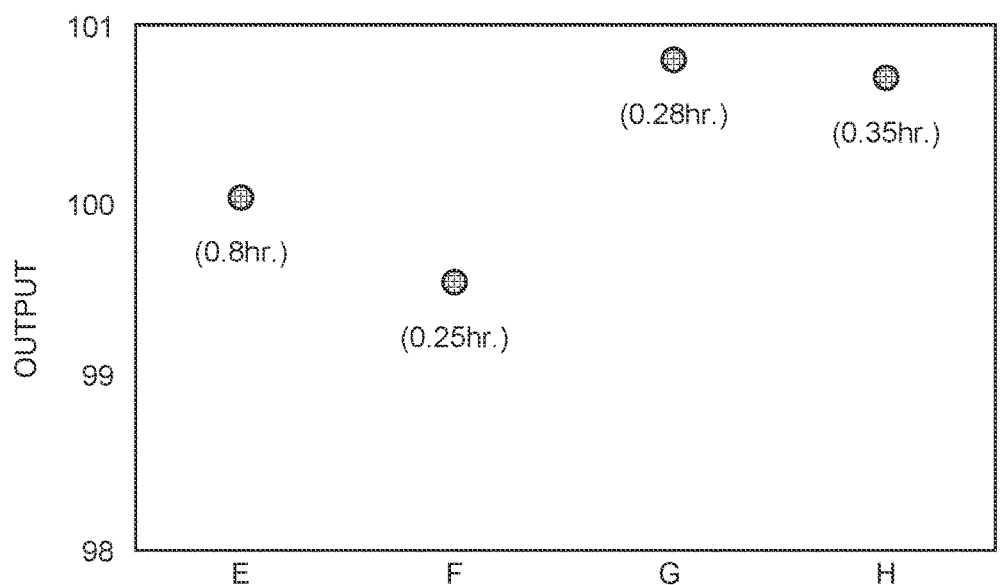

FIG. 12

| CHARGING PATTERN | | FIFTH EMBODIMENT |
|---|---|---|
| FIRST PATTERN | CURRENT RATE | 5C |
| | VOLTAGE | Ve1 |
| | CONTROL CONDITION | CONSTANT CURRENT CONSTANT VOLTAGE (TERMINATION CURRENT 0.25 C) |
| SECOND PATTERN | CURRENT RATE | 5C |
| | VOLTAGE | Ve2 |
| | CONTROL CONDITION | CONSTANT CURRENT CONSTANT VOLTAGE (TERMINATION CURRENT 0.25 C) |
| THIRD PATTERN | CURRENT RATE | 5C |
| | VOLTAGE | Ve3 |
| | CONTROL CONDITION | CONSTANT CURRENT CONSTANT VOLTAGE (TERMINATION CURRENT 0.25 C) |
| FOURTH PATTERN | CURRENT RATE | 5C |
| | VOLTAGE | V4 |
| | CONTROL CONDITION | CONSTANT CURRENT CONSTANT VOLTAGE (TERMINATION CURRENT 0.25 C) |

INITIAL CHARGING METHOD AND PRODUCTION METHOD FOR LITHIUM-ION BATTERY

INCORPORATION BY REFERENCE

The disclosure of Japanese Patent Application No. 2015-024391 filed on Feb. 10, 2015 including the specification, drawings and abstract is incorporated herein by reference in its entirety.

BACKGROUND OF THE INVENTION

1. Field of the Invention

The invention relates to an initial charging method and a production method for a lithium-ion battery.

2. Description of Related Art

In recent years, a lithium-ion battery is in wide use as a secondary battery. In the lithium-ion battery, a film is formed on an electrode surface through an initial charging process. According to Japanese Patent Application Publication No. 2012-227035 (JP 2012-227035 A), for example, a solid electrolyte interface (SEI) film is formed when a carbon-based material on a surface of a negative electrode mixture layer reacts with an electrolyte in a non-aqueous electrolyte-type lithium-ion battery.

In JP 2012-227035 A, charging and discharging are repeated in a film-forming voltage region in the initial charging process for the lithium-ion battery (battery) for the formation of the SEI film. More specifically, the battery is subjected to initial charging first in a pre-charging process to be allowed to enter the film-forming voltage region. Then, a charging and discharging repetition process is started so that charging and discharging is repeated in the film-forming voltage region. Once the charging and discharging repetition process is over, the battery is charged up to a full charge voltage. The SEI film is formed when the charging and discharging is repeated as described above in the film-forming voltage region suitable for film formation.

The film-forming voltage depends on material conditions regarding a negative electrode active material, an electrolyte, an additive, and the like as well as a positive electrode active material and charging conditions. Accordingly, in some cases, the film is insufficiently formed and a sufficient output performance is not achieved even when a decomposition voltage attributable to the positive electrode active material is used as a specified voltage.

SUMMARY OF THE INVENTION

The invention provides an initial charging method and a production method for a lithium-ion battery allowing an appropriate film formation.

An initial charging method for a lithium-ion battery according to an aspect of the invention includes preparing a cell having a positive electrode, a negative electrode, and an electrolyte and charging the cell by using voltages based on an amount of change in a capacity of the cell per unit voltage as a specified voltage. According to this aspect, a film can be appropriately formed.

In the initial charging method described above, CCCV charging may be performed with the highest one of the voltages based on the amount of change in the capacity of the cell per unit voltage being used as the specified voltage. This charging using a film-forming voltage as the specified voltage allows the film to be formed with a higher level of accuracy.

In the initial charging method described above, a plurality of the specified voltages may be set and the CCCV charging with respect to the plurality of specified voltages may be performed in order from a low voltage toward a high voltage. In this case, CV charging can be performed at a decomposition voltage of each material, and thus the film can be formed with a higher level of accuracy.

The initial charging method described above may further include a first charging process of performing CC charging of the cell up to the specified voltage and a second charging process of charging the cell up to a full charge voltage at a current rate higher than a current rate of the CC charging in the first charging process after the first charging process. In the second charging process, the charging is performed at a high rate after the film is appropriately formed through the first charging process, and thus the film can be appropriately formed and a duration of an initial charging process can be shortened at the same time.

In the initial charging method described above, the specified voltage may be set based on a peak end voltage of a differential capacity curve showing a change in the capacity of the cell per unit voltage. Then, the film can be further appropriately formed.

In the initial charging method described above, the specified voltage may be set based on a peak top voltage of a differential capacity curve showing a change in the capacity of the cell per unit voltage. Then, the film can be further appropriately formed.

According to the invention, an initial charging method and a production method for a lithium-ion battery allowing an appropriate film formation can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a table illustrating charging and discharging patterns of batteries according to the first embodiment and the second embodiment;

FIG. 8 is a table illustrating charging and discharging patterns of batteries according to the third embodiment and the fourth embodiment;

FIG. 9 is a drawing illustrating low-temperature output performances of the batteries charged by initial charging methods according to the third embodiment and the fourth embodiment;

FIG. 12 is a table illustrating charging patterns according to an initial charging method relating to the fifth embodiment;

DETAILED DESCRIPTION OF EMBODIMENTS

Figure 1:
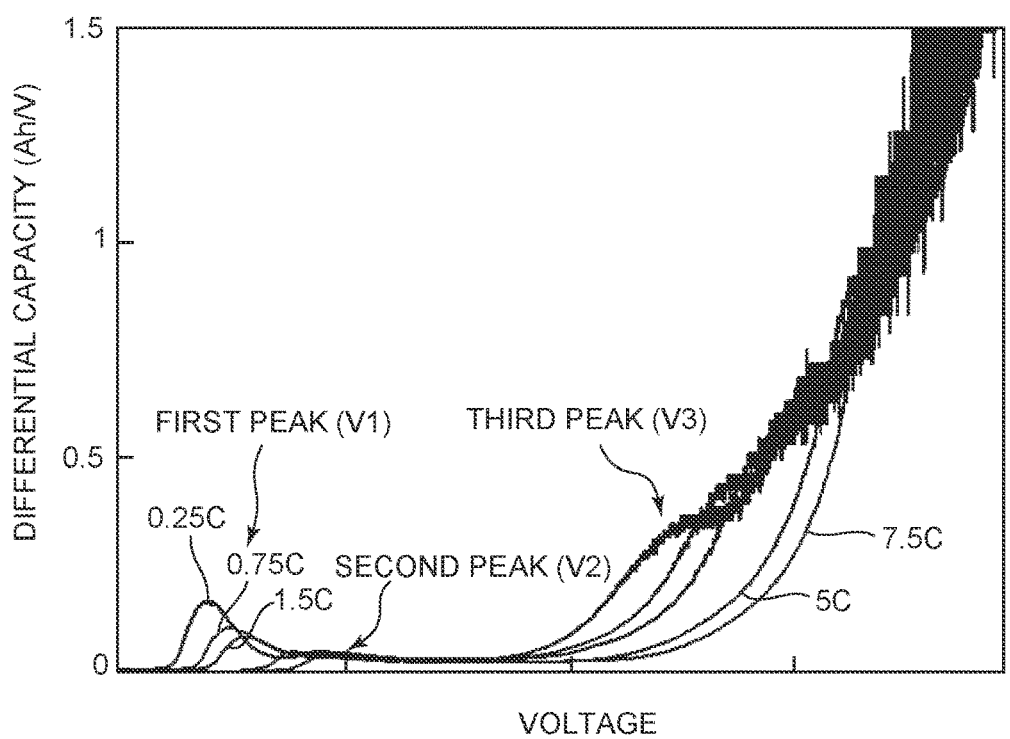
FIG. 1 is a graph illustrating a differential capacity curve in a case where a sample of the first embodiment is subjected to initial charging.

Hereinafter, an initial charging method and a production method for a lithium-ion battery according to embodiments of the invention will be described in detail with reference to accompanying drawings. The invention is not limited to the following embodiments. The following description and drawings are appropriately simplified for clarity of description. The same reference numerals in the drawings represent configurations identical in substance.

First Embodiment

An initial charging method according to this embodiment includes a process for preparing a cell that has a positive electrode, a negative electrode, and an electrolyte and a process for charging the cell up to a specified voltage. The specified voltage is set by a voltage based on the amount of change in capacity.

A test that the inventor of the present application conducted in order to set the specified voltage will be described first. Samples for evaluation for the setting of the specified voltage are prepared. The samples have the following material configuration.

Positive electrode active material: Ni—Mn—CO ternary system
Negative electrode active material: carbon
Electrolyte solvent: mixed system of ethylene carbonate (EC), dimethyl carbonate (DMC), and ethyl methyl carbonate (EMC) supporting electrolyte salt: LiPF$_6$ additive: two phosphorus-based A differential capacity curve (dQ/dV) is obtained by the prepared samples being charged at constant current rates. Herein, five samples are prepared and the CC charging is performed at current rates of 0.25 C, 0.75 C, 1.5 C, 5 C, and 7.5 C. The C rate, which is a unit of the current rates, is a value that is obtained by dividing a charging current (A) by a capacity value (Ah).

FIG. 1 shows the differential capacity curve obtained by the sample measurement. The differential capacity curve is a graph illustrating a relationship between a differential capacity (dQ/dV) obtained by voltage-differentiating a charging and discharging capacity and the voltage. Accordingly, FIG. 1 shows the amount of change in the capacity of the cell per unit voltage in the case of initial charging of the samples for evaluation at the current rates described above. The horizontal axis in FIG. 1 represents the voltage (V) and the vertical axis in FIG. 1 represents the differential capacity (dQ/dV).

The differential capacity (dQ/dV) is an index showing a film formation reaction amount. In a case where it is assumed that the battery has a constant internal resistance, for example, the voltage varies depending on film formation despite the initial charging based on a constant current. In other words, the film is formed on the electrode by an overvoltage amount of the charging current. The film formation is in progress as the differential capacity increases. As illustrated in FIG. 1, three film formation-derived peaks are confirmed on the differential capacity curve based on the initial charging of the samples. The three peaks are regarded as, for example, a first peak voltage V1 to a third peak voltage V3 in order. The first peak voltage V1 to the third peak voltage V3 that are illustrated in FIG. 1 are peaks in the case of constant current charging at 0.25 C.

At the peak voltage, the amount of change in the capacity per unit voltage is large. Accordingly, it is surmised that the peak voltage is a film-forming voltage at which the film formation is in progress. At the film-forming voltage, the film is formed on the positive electrode and the negative electrode. The film is formed on an interface of the electrode and the electrolyte. In a non-aqueous electrolyte-type lithium-ion battery, for example, an SEI film is formed by a carbon material of the negative electrode reacting with the electrolyte. The film can be appropriately formed by the initial charging at a low current rate being performed at this film-forming voltage.

Figure 2:
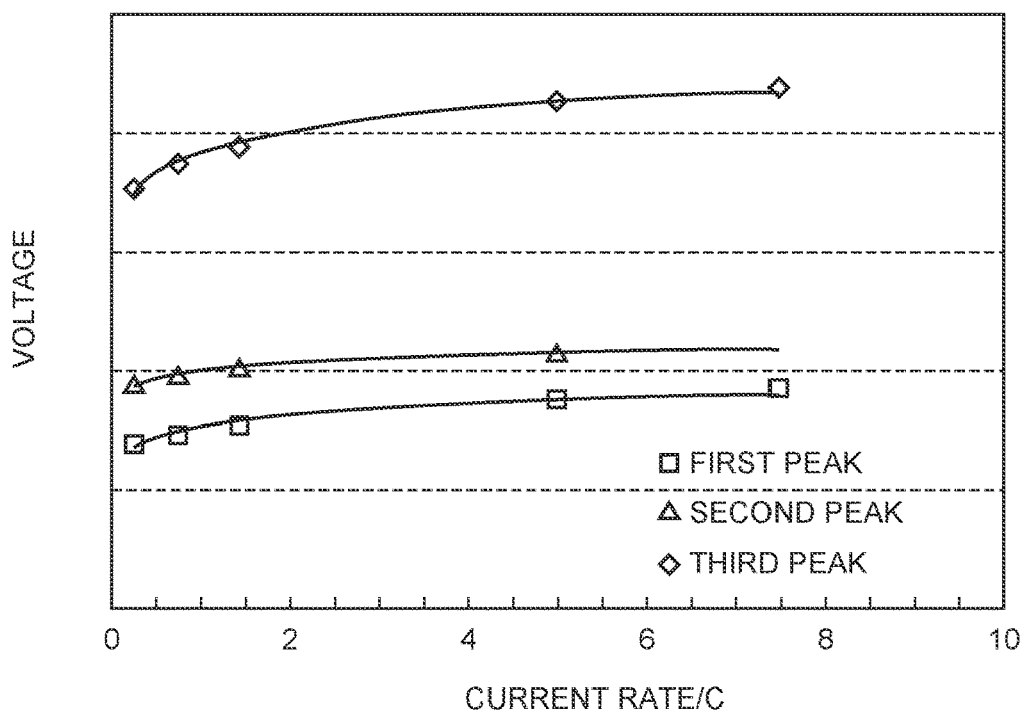
FIG. 2 is a graph illustrating a relationship between a current rate and a peak voltage regarding the sample of the first embodiment.

The peak voltages measured at the respective current rates are shown in FIG. 2. The horizontal axis in FIG. 2 represents the current rate (C) and the vertical axis in FIG. 2 represents the peak voltage (V). In FIG. 2, each of the first peak voltage, the second peak voltage, and the third peak voltage is plotted. As illustrated in FIG. 2, each of the peak voltages increases as the current rate increases.

In a first charging process, the charging is performed at a low rate up to the specified voltage. Accordingly, the current rate during the film formation can be low. After the first charging process, the charging is performed at a high rate up to full charging. Accordingly, the charging can be performed at a high speed after the film formation. When the charging is performed at a high rate during the film formation, an overvoltage effect increases. Accordingly, the film might not be formed appropriately. Hence, it is preferable that the peak voltage is extracted from the differential capacity curve in a case where the CC charging is performed at a current rate of 0.5 C or less and this peak voltage becomes the specified voltage. In this embodiment, the peak voltages (V1 to V3) are extracted from the differential capacity curve in the case of the charging at 0.25 C.

A second charging process is a charging process subsequent to an appropriate film formation, and thus the current rate can be increased. In other words, a deterioration of battery characteristics can be suppressed even in a case where the second charging process is performed at a high current rate. Accordingly, a good film can be formed and a battery performance can be improved even in a case where the initial charging is performed at a high speed.

The specified voltage is set based on the differential capacity curve as described above. Specifically, the specified voltage is set based on the peak voltage on the differential capacity. The peak voltage on the differential capacity curve varies depending on materials of the positive electrode, the negative electrode, the electrolyte, and the like. Accordingly, the specified voltage can be set in accordance with the materials of the battery. In other words, different specified voltages are set for different materials. Accordingly, the sample for evaluation is prepared for each material, and then the differential capacity curve in the case of the initial charging is measured. Then, the specified voltage is set for each material. In this manner, the specified voltage can be appropriately set and the film can be appropriately formed.

Figure 4:
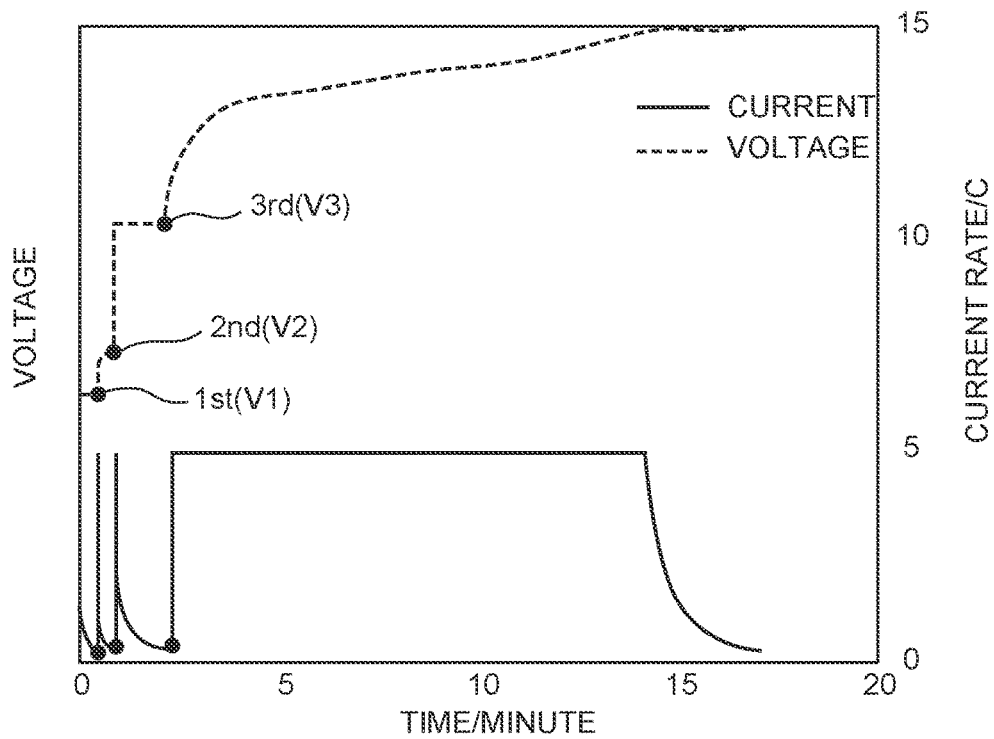
FIG. 4 is a graph illustrating a charging current and a charging voltage regarding the initial charging of the battery according to the first embodiment.

The initial charging process using the specified voltage will be described below. A battery that has the same material configuration as the battery sample for evaluation with the measured differential capacity curve is prepared for the setting of the specified voltage. Then, the initial charging is performed on this battery. Charging patterns regarding the initial charging are illustrated in the table of FIG. 3. Not only charging patterns relating to the initial charging method according to the first embodiment but also charging patterns relating to the second embodiment (described later) are illustrated in FIG. 3. A charging current and a charging voltage as a result of charging in accordance with the charging patterns illustrated in FIG. 3 are illustrated in FIG. 4. The horizontal axis in FIG. 4 represents time (minute), the left vertical axis in FIG. 4 represents the charging voltage (V), and the right vertical axis in FIG. 4 represents the charging current (C). The dashed line in FIG. 4 represents a voltage waveform and the solid line in FIG. 4 represents a current waveform.

In the first embodiment, first to fourth patterns are set as illustrated in FIG. 3. In the first pattern, the first peak voltage is the specified voltage (first specified voltage V1). In the second pattern, the second peak voltage is the specified voltage (second specified voltage V2). In the third pattern, the third peak voltage is the specified voltage (third specified voltage V3). In the fourth pattern, a full charge voltage is the specified voltage (fourth specified voltage V4).

The first pattern is a charging pattern from the initiation of the initial charging to the first specified voltage (V1 in FIG. 4). The second pattern is a charging pattern from the first specified voltage to the second specified voltage (V2 in FIG. 4). The third pattern is a charging pattern from the second specified voltage to the third specified voltage (Vmax in FIG. 4). The fourth pattern is a charging pattern from the third specified voltage to the full charging.

In the first embodiment, the first to third patterns correspond to the first charging process and the fourth pattern corresponds to the second charging process. In other words, the first charging process is performed in accordance with the first to third patterns. The second charging process is performed in accordance with the fourth pattern.

In the first charging process, constant current constant voltage charging (CCCV charging) is performed more than once. During the CCCV charging, the charging is initially performed at a constant current value, and then the charging is performed while the current value is lowered, so that the voltage is maintained, after the specified voltage is reached. Accordingly, in the first pattern, the CC charging is performed at 5 C until the first specified voltage V1 is reached.

After V1 is reached, the CV charging is performed at a constant voltage of V1. The CV charging has a termination current of 0.25 C. In other words, the charging current is monitored during the CV charging at V1, and the second pattern is put into effect after the charging current is lowered and reaches 0.25 C.

In the second pattern, the CC charging is performed at 5 C until the second specified voltage of V2 is reached. After V2 is reached, the CV charging is performed at a constant voltage of V2. The CV charging has a termination current of 0.25 C. In other words, the charging current is monitored during the CV charging at V2, and the third pattern is put into effect after the charging current is lowered and reaches 0.25 C.

In the third pattern, the CC charging is performed at 5 C until the third specified voltage of V3 is reached. After V3 is reached, the CV charging is performed at a constant voltage of V3. The CV charging has a termination current of 0.25 C. In other words, the charging current is monitored during the CV charging at V3, and the fourth pattern, which is the second charging process, is put into effect after the charging current is lowered and reaches 0.25 C.

In the fourth pattern, the CCCV charging is performed with the full charge voltage of V4 used as the fourth specified voltage. In other words, the CC charging is performed at 5 C until V4 is reached. After V4 is reached, the CV charging is performed at a constant voltage of V4. The CV charging has a termination current of 0.25 C. In other words, the full charging is achieved when the charging current is lowered and reaches 0.25 C during the CV charging at the voltage of V4. As illustrated in FIG. 4, the second charging process continues for a longer period of time than the first charging process.

As described above, the CCCV charging is performed with respect to the first to third specified voltages in the first charging process. In other words, the CCCV charging from the first to third specified voltages are performed in order. Beyond the third specified voltage, the CCCV charging is performed up to the full charging. Then, an effect at the film-forming voltage can be reduced, and thus the film can be appropriately formed. In other words, the CV charging comes into play after the first specified voltage, the second specified voltage, and the third specified voltage as the film-forming voltages are reached. Accordingly, at the film-forming voltage, the current is on a gradual decline and charging at a low rate is possible. Hence, the film can be appropriately formed and the deterioration of the battery performance can be suppressed.

In this embodiment, the specified voltage is set in accordance with the voltage based on the amount of change in the capacity of the cell per unit voltage. Specifically, the peak voltage at which the differential capacity curve has a maximum value is surmised as the film-forming voltage at which the film is formed and this peak voltage is set as the specified voltage. Then, the charging is performed for a low current rate at the specified voltage (such as V3) and the charging is performed for a high current rate (such as 5 C) at a voltage higher than the specified voltage (V3). In other words, the charging is performed at a high current rate at a voltage higher than the film-forming voltage. Then, the charging can be performed at a high speed.

In a case where the differential capacity curve has a plurality of peak voltages, each of the respective peak voltages is regarded as the specified voltage. When the CCCV charging with respect to the plurality of specified voltages is performed in order from the low voltage toward the high voltage, the CV charging can be performed at a decomposition voltage of each material. Accordingly, the film formation can be accurate and a high battery performance can be obtained. The initial charging time can be shortened while the high battery performance is maintained.

In the above description, the three peaks are extracted from the differential capacity curve, and thus the three specified voltages are set in the first charging process. However, the number of the specified voltages is not particularly limited thereto. In other words, the specified voltages can be set in accordance with the number of the peak voltages. In a case where the differential capacity curve has one peak voltage, for example, only one specified voltage may be set. In a case where the differential capacity curve has two peak voltages, two specified voltages may be set. Four or more specified voltages may be set in a case where the differential capacity curve has four or more peak voltages. In this embodiment, every peak voltage can be set as the specified voltage as described above.

The current rates (5 C) for the CC charging in the first to third patterns are equal to the current rate for the fourth pattern. However, the current rates for the CC charging in the first to third patterns may differ from the current rate for the fourth pattern as well. The current rates for the CC charging in the first to third patterns may be lower than the current rate for the fourth pattern. In addition, the current rates for the CC charging in the first to third patterns may be three different values. In addition, the termination currents for the CV charging in the first to fourth patterns may be values differing from each other. For example, the termination current of the first to third patterns may be lower than the termination current of the fourth pattern.

Second Embodiment

An initial charging method according to the second embodiment will be described. In the first embodiment described above, the plurality of specified voltages are set and the CCCV charging is repeatedly performed in the first charging process. In the second embodiment, however, only one specified voltage is set for the first charging process and the CC charging at a low current rate is performed until the specified voltage is reached. The lithium-ion battery relating to the second embodiment has a material similar to that relating to the first embodiment.

Figure 5:
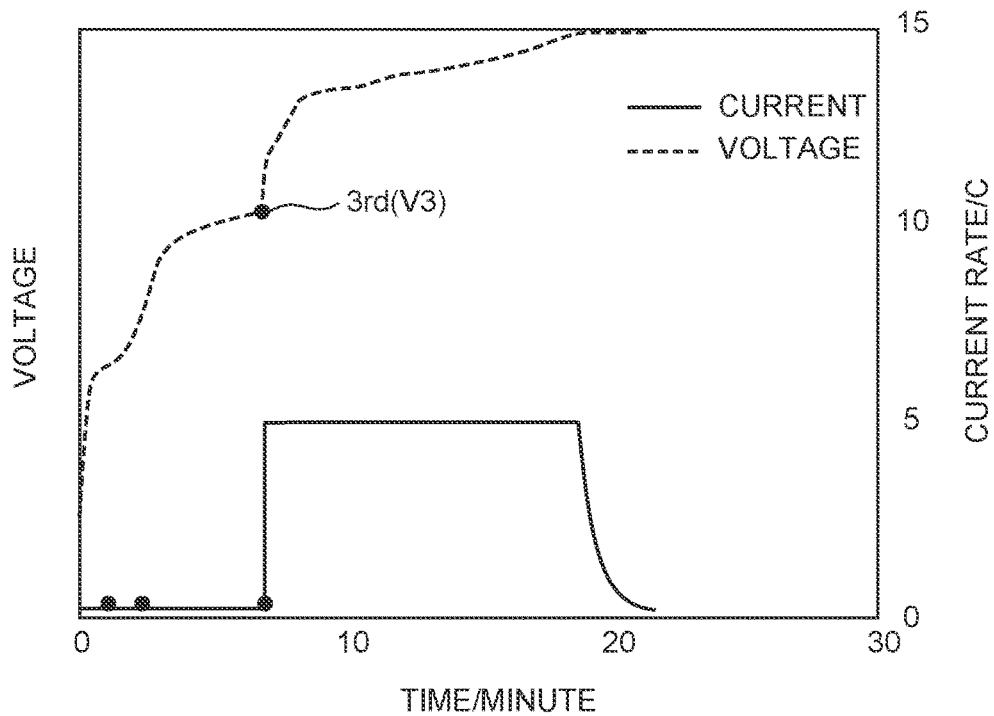
FIG. 5 is a graph illustrating a charging current and a charging voltage regarding the initial charging of the battery according to the second embodiment.

The initial charging method relating to the second embodiment will be described with reference to FIGS. 3 and 5. FIG. 3 is a table illustrating the charging patterns according to the second embodiment. FIG. 5 is a graph illustrating a current waveform and a voltage waveform in the case of charging following the charging patterns according to this embodiment. The horizontal axis in FIG. 5 represents time (minute), the left vertical axis in FIG. 5 represents the charging voltage (V), and the right vertical axis in FIG. 5 represents the charging current (C). The dashed line in FIG. 5 represents the voltage waveform and the solid line in FIG. 5 represents the current waveform.

In the second embodiment, the charging patterns consist of the third pattern and the fourth pattern. The third pattern is the first charging process and the fourth pattern is the second charging process. The second charging process following the fourth pattern is similar to that of the first embodiment.

In the first charging process following the third pattern, charging at 0.25 C is performed until the third peak voltage (V3) is achieved. In other words, the CC charging at a low current rate is performed with the highest one of the plurality of peak voltages used as the specified voltage. After the specified voltage is reached, the CC charging at a current rate higher than in the first charging process is performed as the second charging process. Then, the charging waveform that is illustrated in FIG. 5 is obtained. The current rate in the second charging process is 5 C. In the second charging process, the CCCV charging is performed with the full charge voltage (V4) being regarded as the specified voltage as in the first embodiment.

Accordingly, the CC charging at a low current rate of 0.25 C is performed until V3 is reached after the initiation of the initial charging. Then, the CC charging up to V4 is performed at 5 C after V3 is exceeded. After V4 is reached, the CV charging is performed at V4. Then, the battery is charged until fully charged.

In the second embodiment as well as the first embodiment, the specified voltage is obtained based on the differential capacity curve using the measurement of the sample having the same material. In addition, the highest one of the voltages based on the amount of change in the capacity of the cell per unit voltage is set as the specified voltage. Specifically, the highest one of the plurality of peak voltages is used as the specified voltage. Then, in the first charging process, the CC charging is performed at a low current rate up to the specified voltage. In the second charging process, the CC charging is performed at a high current rate from the specified voltage. As described above, the current rate is changed at almost the same time as the specified voltage is reached. Then, the effect at the film-forming voltage can be further reduced, and thus the film can be appropriately formed. In the first charging process, it is preferable that the charging is performed at a current rate of 0.5 C or less. Herein, the CC charging is conducted at 0.25 C, which is the current rate of the differential capacity curve from which the peak voltage is extracted.

Figure 6:
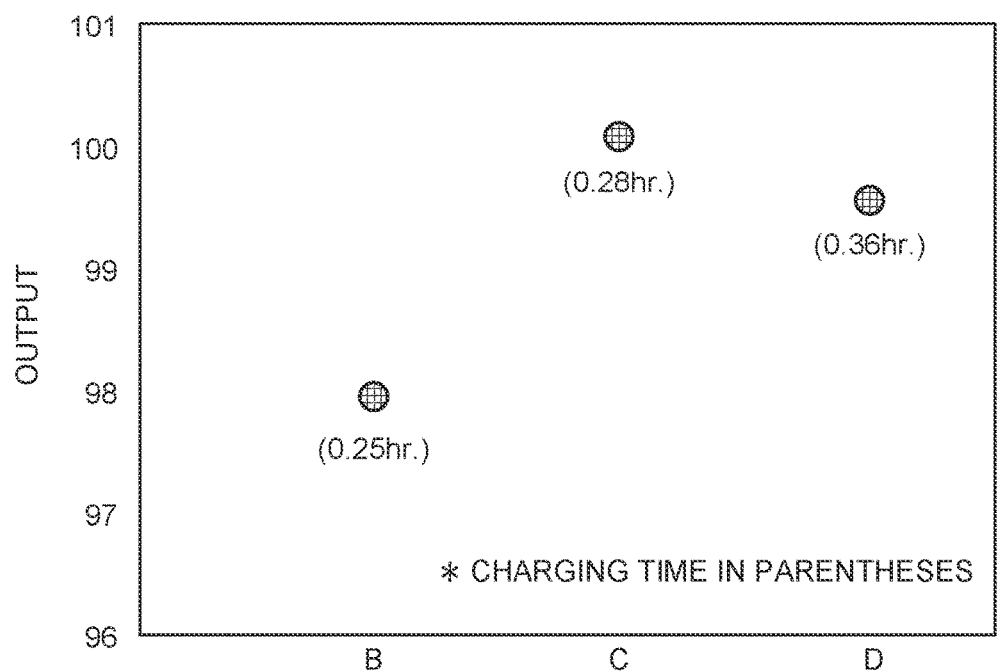
FIG. 6 is a drawing illustrating low-temperature output performances of the batteries charged by initial charging methods according to the first embodiment and the second embodiment.

(Characteristic Evaluation) The characteristics of the batteries charged by the initial charging methods relating to the first and second embodiments are illustrated in FIG. 6. In FIG. 6, the battery subjected to the CC charging at 5 C is shown as Comparative Example B, the battery charged in accordance with the charging pattern relating to the first embodiment is shown as a battery C, and the battery charged in accordance with the charging pattern relating to the second embodiment is shown as a battery D. The vertical axis in FIG. 6 represents a low-temperature output, showing a relative value in a case where an output of a battery subjected to the CC charging at 1.5 C (hereinafter, referred to as a reference battery) is 100. Charging times are shown in the parentheses of FIG. 6.

According to Comparative Example B, the relative output in a case where the output of the reference battery is 100 is approximately 98. According to the battery C of the first embodiment, the initial charging time is a short period of time of 0.28 hr (16.8 minutes) and the output is approximately 100, which is larger than that of Comparative Example B. Accordingly, fast charging is possible without output characteristics being deteriorated. According to the battery D of the second embodiment, the initial charging time is a short period of time of 0.36 hr (21.6 minutes) and the output is at least 99, which is larger than that of Comparative Example B. The deterioration of the performance can be prevented even in the case of high-speed initial charging. Hence, a high-performance lithium-ion battery can be produced with a high level of productivity.

The characteristic evaluation was performed with the current rate of the charging pattern of the first embodiment changed from 5 C to 7.5 C so that the time is further shortened. As a result, the relative low-temperature output in a case where the output of the reference battery was 100 became 98, and a performance improvement equivalent to that of the battery C was not found. Accordingly, it is preferable that the current rate during the CC charging is 5 C or less. In the case of the CC charging at 7.5 C, the charging time is 0.22 hr.

The first embodiment and the second embodiment can be combined with each other. For example, a plurality of specified voltages may be set and then the charging up to some of the specified voltages may be performed by the CC charging at a low rate as in the second embodiment while the CCCV charging is performed as in the first embodiment for the other specified voltages.

Third Embodiment

In an initial charging method according to this embodiment, a battery that has a different material than the battery of the first embodiment is subjected to the initial charging. In this the third embodiment, the electrolyte has one phosphorus-based and one boron-based additives unlike in the first embodiment. The materials other than those of the electrolyte additives are similar to those of the first embodiment. Due to the difference in material, the third embodiment has a different specified voltage than that of the first embodiment. The third embodiment is similar to the first embodiment in terms of those other than the material and specified voltage, and thus description thereof will be appropriately omitted.

Figure 7:
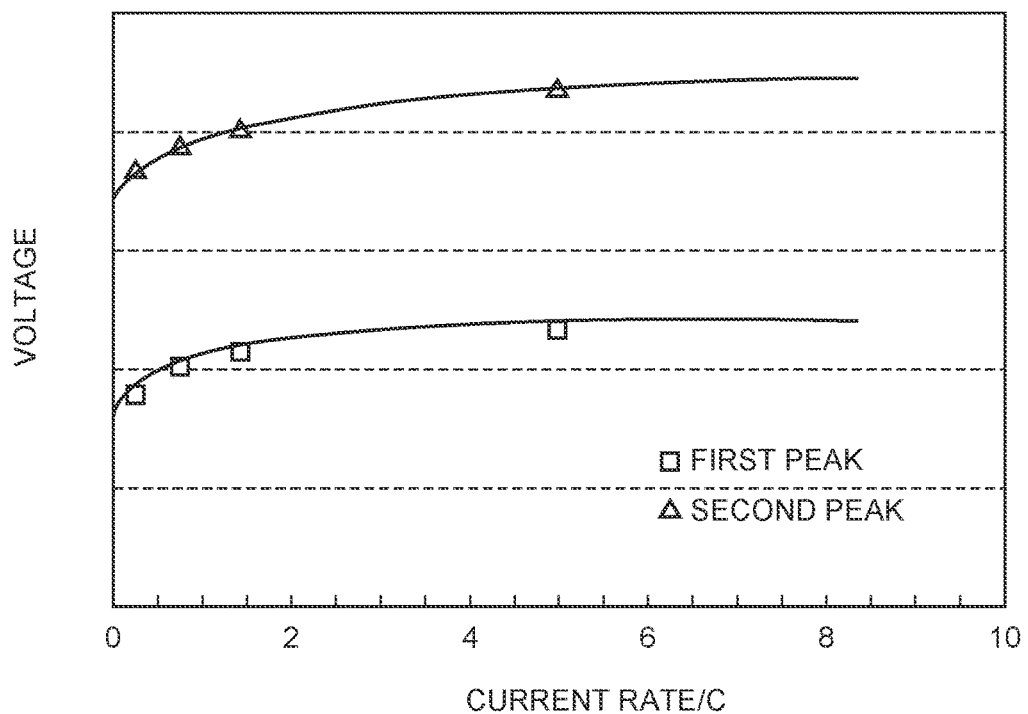
FIG. 7 is a graph illustrating a relationship between a current rate and a peak top voltage regarding a sample of the third embodiment.

A battery sample for evaluation that has one phosphoric acid-based and one boric acid-based electrolyte additives along with the other materials similar to those of the first embodiment is prepared. Then, the CC charging is performed on the sample and the differential capacity curve is obtained. In this embodiment, five samples are prepared and the CC charging is performed at charging rates of 0.25 C, 0.75 C, 1.5 C, 5 C, and 7.5 C. FIG. 7 shows current rate-peak voltage relationships. The horizontal axis in FIG. 7 represents the current rate (C) and the vertical axis in FIG. 7 represents the peak voltage (V). In the sample according to this embodiment, two peaks are obtained on the differential capacity curve. No peak voltage is plotted with regard to the current rate (7.5 C) allowing no peak voltage extraction.

The first specified voltage is V1 and the second specified voltage is V2 based on the peak voltage at 0.25 C. The additive of this embodiment differs from the additives of the first and second embodiments. Accordingly, the first specified voltage V1 and the second specified voltage V2 according to this embodiment are values that differ from the first specified voltage V1 and the second specified voltage V2 according to the first and second embodiments. As described above, the peak voltage and the number of the peaks change depending on the materials of the battery. Accordingly, the sample is created and the differential capacity curve is acquired in accordance with the material of the battery to be charged. Then, the specified voltage depending on the battery material can be acquired. In other words, different specified voltages are set for batteries with different material configurations.

In the third embodiment, the charging patterns are set in accordance with two specified voltages. Accordingly, the initial charging is performed in accordance with the charging patterns that are illustrated in FIG. 8. FIG. 8 is a table illustrating the charging patterns according to the initial charging method of the third embodiment and charging patterns according to the fourth embodiment (described later).

As described above, V1 and V2 are extracted as the peak voltages. The first charging process includes the first pattern that has the first peak voltage (V1) as the specified voltage (first specified voltage) and the second pattern that has the second peak voltage (V2) as the specified voltage. The second charging process includes the third pattern that has the full charge voltage (V3) as the specified voltage.

In the first charging process, the CCCV charging with respect to the first specified voltage V1 and the CCCV charging with respect to the second specified voltage are performed. The CV charging has a termination current of 0.25 C. The CC charging at 5 C is performed until the first specified voltage (V1) is achieved, and the CV charging is performed at the constant voltage (the first specified voltage V1) after the first specified voltage V1 is reached. Then, the CC charging is conducted at 5 C until the second specified voltage V2 is achieved after the charging current is lowered and reaches the termination current (0.25 C) in the CV charging. After the second specified voltage V2 is reached, the CV charging at the constant voltage (the second specified voltage V2) is performed. Then, the third pattern, which is the second charging process, comes into play after the charging current is lowered and reaches the termination current (0.25 C) in the CV charging.

In the third pattern, the CCCV charging is performed with the full charge voltage (V3) used as the specified voltage (third specified voltage). The CC charging at 5 C is performed until V3 is achieved. After V3 is reached, the CV voltage is performed at the constant voltage (the full charge voltage V3). Then, the initial charging is terminated once the current is lowered and reaches the termination current (0.25 C). In this manner, the film can be appropriately formed even in the case of the fast charging. Accordingly, effects similar to those achieved by the first embodiment can be achieved even for the battery with the different materials.

In the above description, the first to third patterns have the same values for the current rate of the CC charging and the termination current of the CV charging. However, some or all of the values may differ from each other.

Fourth Embodiment

An initial charging method according to the fourth embodiment will be described. In the fourth embodiment, a battery using a similar material to the third embodiment is subjected to the initial charging in different charging patterns. In the fourth embodiment, the CC charging at a low current rate is performed in the first charging process as in the second embodiment. Accordingly, the charging patterns according to the fourth embodiment are provided with the second pattern as the first charging process and the third pattern as the second charging process. In other words, the first charging process is performed in accordance with the second pattern and the second charging process is performed in accordance with the third pattern.

In the first charging process, the CC charging at 0.25 C is performed until the specified voltage (V2) as the second peak voltage is achieved. Then, the second charging process comes into play after the specified voltage is reached. In the second charging process, the CCCV charging is performed until the full charge voltage (V3) is achieved. In other words, the CC charging is performed at 5 C up to V3, and the CV charging is performed after the full charge voltage is achieved. The initial charging is terminated once the termination current (0.25 C) is achieved in the CV charging.

The specified voltage is set based on the differential capacity curve as described above. In the first charging process, the CC charging is performed up to the specified voltage at a low current rate. In the second charging process, the CC charging is performed at a current rate higher than in the first charging process. Then, the CV charging is performed after the full charge voltage is achieved. Then, the CV charging is terminated after a reduction to the termination current in the CV charging. In this manner, the initial charging can be conducted to reach the full charging. Then, the film can be appropriately formed even in the case of the fast charging. Accordingly, effects similar to those achieved by the first embodiment can be achieved even for the battery with the different materials.

(Characteristic Evaluation) The characteristics of the batteries charged by the initial charging methods relating to the third and fourth embodiments are illustrated in FIG. 9. In FIG. 9, the battery subjected to the CC charging at 1.5 C is shown as Comparative Example E, the battery subjected to the CC charging at 5 C is shown as Comparative Example F, the battery charged by the initial charging method relating to the third embodiment is shown as a battery G, and the battery charged by the initial charging method relating to the fourth embodiment is shown as a battery H. The vertical axis in FIG. 9 represents the low-temperature output, showing a relative value in a case where an output of the Comparative Example E is 100. Charging times are shown in the parentheses of FIG. 9.

The Comparative Example E subjected to the CC charging at 1.5 C has a high output (100) but has an initial charging time of as long as 0.8 hr (48 minutes). The Comparative Example F subjected to the CC charging at 5 C has a short charging time of 0.25 hr (15 minutes) but with a relative output reduced in a case where the output of the Comparative Example E is 100.

In the battery G according to the third embodiment, the charging time is a short period of time of 0.28 hr (16.8 minutes) and the relative output in a case where the output of the Comparative Example E is 100 is at least 100 as well. In the battery H according to the fourth embodiment, the initial charging time is a short period of time of 0.35 hr (21 minutes) and the relative output in a case where the output of the Comparative Example E is 100 is at least 100. Accordingly, initial charging patterns of the third embodiment and the fourth embodiment allow the performance to be improved. In other words, an output higher than that of the battery subjected to the CC charging at 1.5 C can be obtained with the materials of the third embodiment and the fourth embodiment. The deterioration of the performance can be prevented even in the case of the high-speed initial charging. Hence, a high-performance lithium-ion battery can be produced with a high level of productivity.

The third embodiment and the fourth embodiment can be combined with each other. For example, a plurality of specified voltages may be set and then the charging up to some of the specified voltages may be performed by the CC charging at a low rate as in the second embodiment while the CCCV charging is performed as in the first embodiment for the other specified voltages.

Fifth Embodiment

Figure 10:
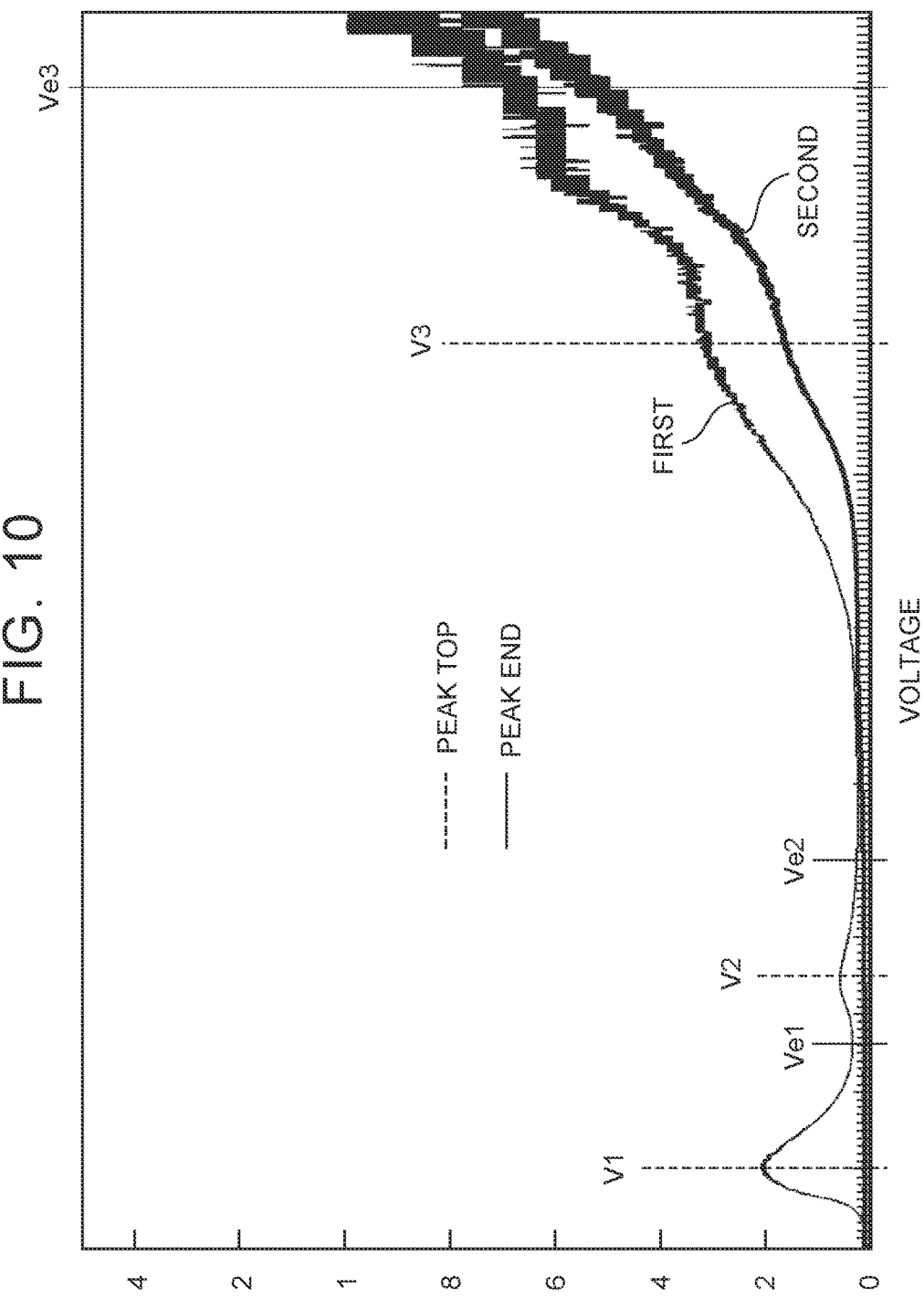
FIG. 10 is a graph illustrating a differential capacity curve in a case where a sample of the fifth embodiment is charged twice.

An initial charging method according to this the fifth embodiment will be described with reference to FIG. 10. FIG. 10 is a graph illustrating a differential capacity curve of the battery sample for evaluation. A differential capacity curve in the case of the CC charging at 0.25 C is illustrated in FIG. 10. In addition, differential capacity curves of the first charging cycle (initial charging) and the second charging cycle are illustrated in FIG. 10. A case where the initial charging (first in FIG. 10) up to the full charging is performed, the sample is discharged once, and then the sample is charged again is shown as the second charging. In this embodiment, the differential capacity curve is obtained by a sample being used which has the same material as in the first embodiment.

In the first embodiment, the specified voltage is obtained based on a peak top voltage. In this embodiment, however, the specified voltage is obtained based on a peak end voltage. As illustrated in FIG. 10, the peak end voltage with respect to the peak top (first peak voltage) of V1 is Ve1. The peak end voltage with respect to the peak top (second peak voltage) of V2 is Ve2. The peak end voltage with respect to the peak top (third peak voltage) of V3 is Ve3.

Figure 11:
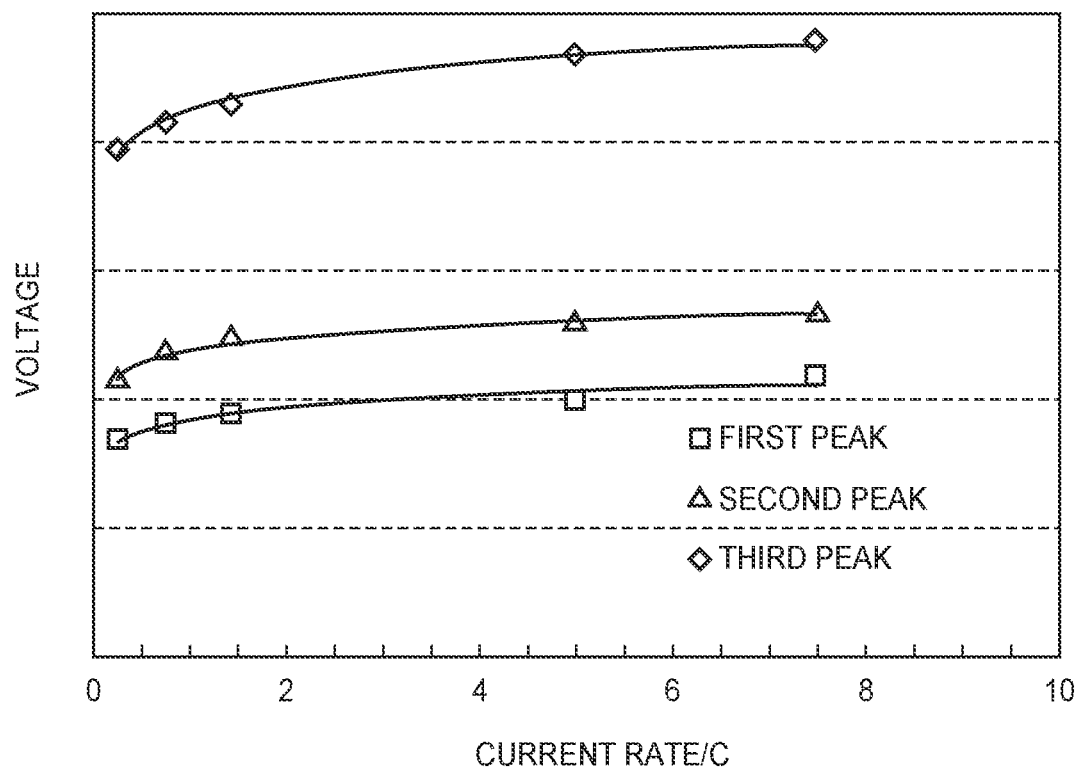
FIG. 11 is a graph illustrating a relationship between a current rate and a peak end voltage.

The respective peak end voltages obtained with respect to 0.25 C, 0.75 C, 1.5 C, 5 C, and 7.5 C are illustrated in FIG. 11. In FIG. 11, first to third peak end voltages in a case where the current rate varies are illustrated. A minimum value of the differential capacity curve for the initial charging can be extracted as the peak end voltage.

In this embodiment, the specified voltage is set based on the peak end voltage of the initial charging. Herein, the peak end voltages Ve1, Ve2, Ve3 at 0.25 C are the specified voltages. The specified voltage can be set based on the peak end voltage of the differential capacity curve as described above. In this embodiment, the battery has a material configuration from which the three peaks appear, and thus the three specified voltages are set. However, the peak end voltage and the number of the peaks vary depending on the material configuration.

In addition, in this embodiment, the differential capacity curve in the first charging cycle and the differential capacity curve based on the second charging cycle are used so that the peak end voltage is extracted from the differential capacity curve for the initial charging. In other words, the peak end voltage is obtained through a comparison between the differential capacity curve of the first cycle and the differential capacity curve of the second cycle. For example, a value is obtained by subtracting the differential capacity curve of the first cycle from the differential capacity curve of the second cycle. A voltage at which the value obtained by the subtraction has a minimum value can be the peak end voltage.

FIG. 12 is a table illustrating charging patterns in a case where the specified voltage is set from the peak end voltage. Ve1 is set as the first specified voltage, Ve2 is set as the second specified voltage, and Ve3 is set as the third specified voltage. The battery is charged in accordance with the charging patterns illustrated in FIG. 12. In other words, the first specified voltage V1 to the third specified voltage V3 according to the charging patterns of the first embodiment are substituted with Ve1, Ve2, Ve3 in these charging patterns, respectively. The fourth specified voltage V4, which is the full charge voltage, is the same as in the first embodiment.

Figure 13:
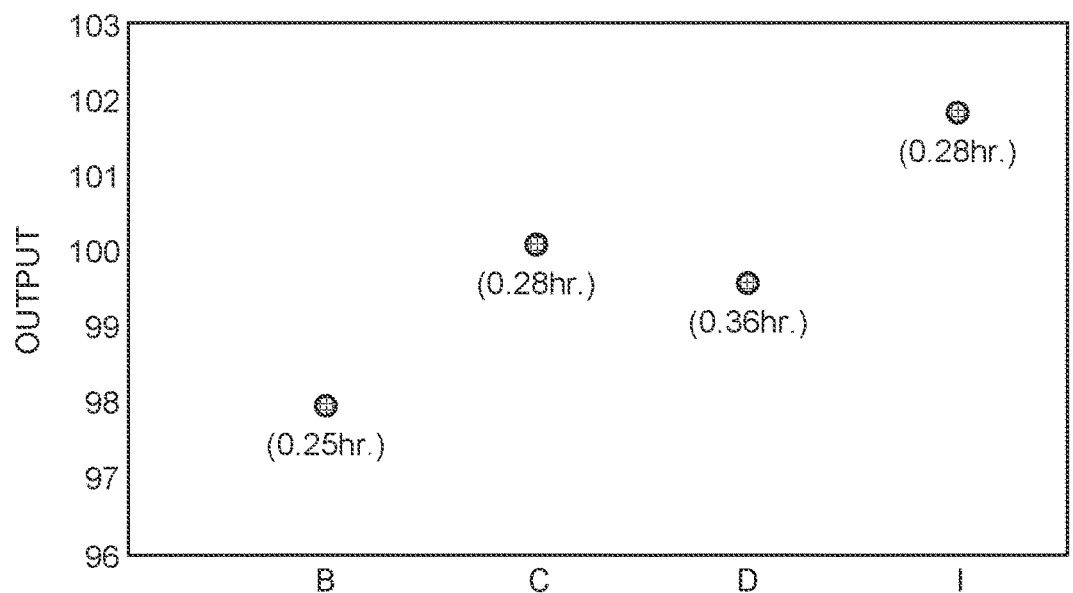
FIG. 13 is a drawing illustrating a low-temperature output performance of a battery charged by the initial charging method according to the fifth embodiment.

In this embodiment, the peak end voltage is set as the specified voltage as described above. Then, a battery performance higher than in the first embodiment can be achieved. FIG. 13 shows the output characteristics of the battery charged in the charging pattern according to the fifth embodiment. In FIG. 13, the low-temperature output of the battery subjected to the initial charging in the charging pattern according to the fifth embodiment as well as Comparative Example B and the batteries C, D according to FIG. 6 is illustrated (I in FIG. 13). In addition, charging time is illustrated in the parentheses. FIG. 13 also shows a relative output in a case where the output of the reference battery subjected to the constant current charging at 1.5 C is 100.

In the battery I, the relative low-temperature output in a case where the output of the reference battery is 100 is approximately 102. Since the specified voltage of the first charging process is set based on the peak end voltage, the low-temperature output characteristics can be improved to surpass those of Comparative Example B and the batteries C, D. In this embodiment, the initial charging can be performed in a short period of time of 0.28 hr, which is equal to that of the battery C. Accordingly, the initial charging can be conducted in a short period of time by the specified voltage being set based on the peak end voltage, and the output performance can be further improved.

Figure 14:
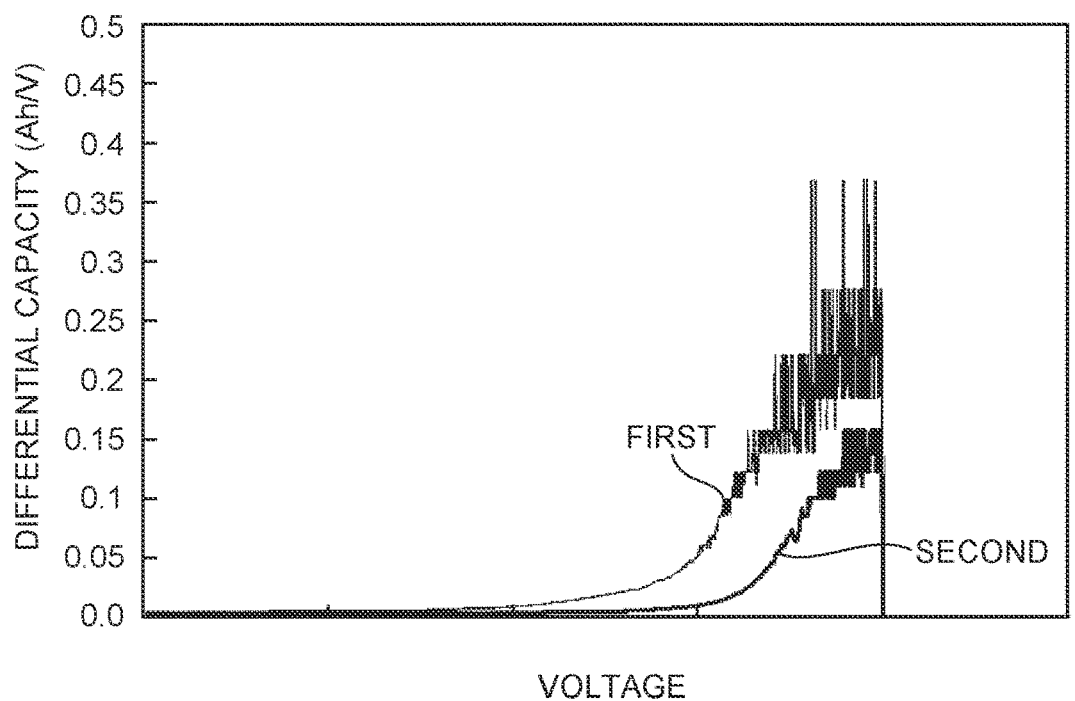
FIG. 14 is a graph illustrating a differential capacity curve in a case where charging is performed twice up to a first peak top voltage.

A difference between a case where the specified voltage is set based on the peak end voltage and a case where the specified voltage is set based on the peak top voltage will be described below with reference to FIGS. 14 to 16. FIG. 14 is a drawing illustrating a differential capacity curve in a case where the CC charging up to V1 as the first peak top voltage is performed twice. In other words, the sample is discharged after the first charging cycle up to V1 is performed at 0.25 C. Then, the discharged sample is re-charged up to V1 at 0.25 C. The differential capacity curve in this case where the CC charging is performed twice is illustrated in FIG. 14. The current rate is 0.25 C.

Figure 15:
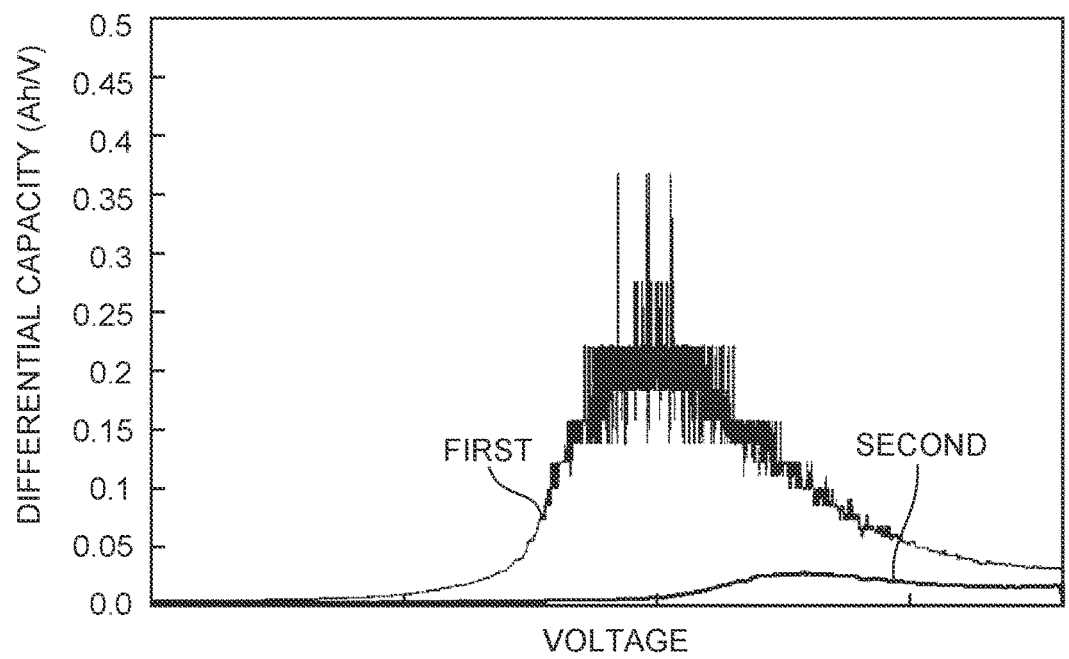
FIG. 15 is a graph illustrating a differential capacity curve in a case where charging is performed twice up to a first peak end voltage.
Figure 16:
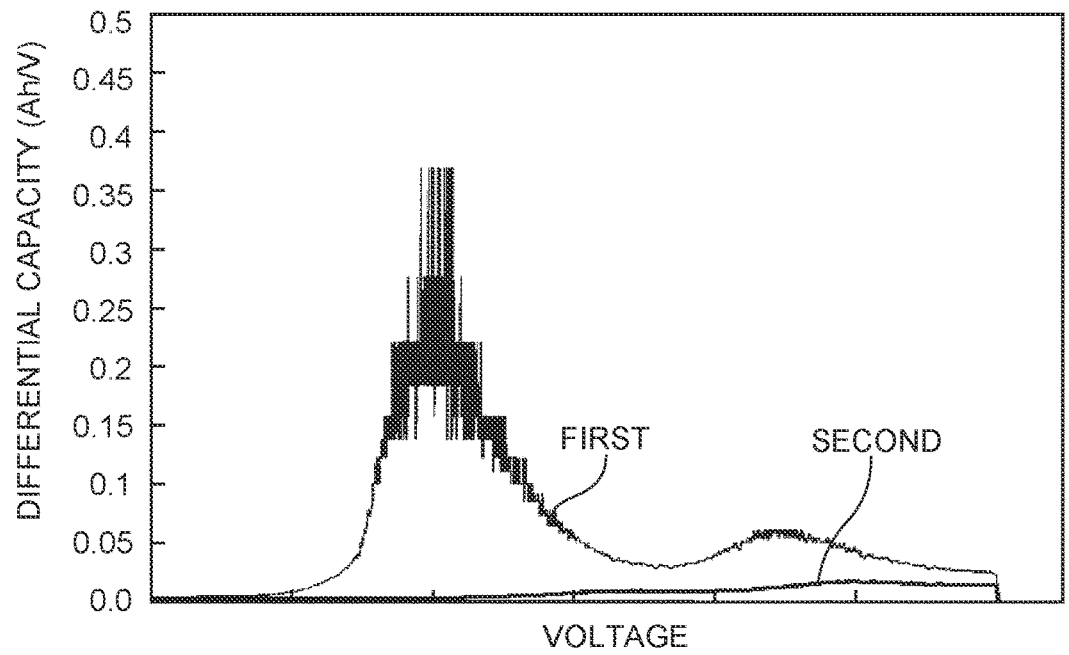
FIG. 16 is a graph illustrating a differential capacity curve in a case where charging is performed twice up to a second peak end voltage.

Differential capacity curves in a case where the CC charging up to Ve1, Ve2 is performed twice in a similar manner are illustrated in FIGS. 15 and 16. At any of the specified voltages, the differential capacity of the second charging cycle is smaller than the differential capacity of the first charging cycle. In other words, the film is formed in the first charging cycle, and thus the second charging has a reduced differential capacity.

In the charging up to the first peak top voltage V1, however, the first charging and the second charging have a small differential capacity difference as illustrated in FIG. 14. The differential capacity difference is large, as illustrated in FIGS. 15 and 16, in the charging up to the first peak end voltage Ve1 and the charging up to the second peak end voltage Ve2. In other words, in the case of the charging up to the peak end voltage, the differential capacity in the second charging cycle is substantially smaller than the differential capacity in the first charging cycle. This is considered to be because the film formation on the electrode is in progress in comparison to the charging up to the peak top voltage. Accordingly, the film can be appropriately formed by the charging at a low current rate at the peak end voltage.

Figure 17:
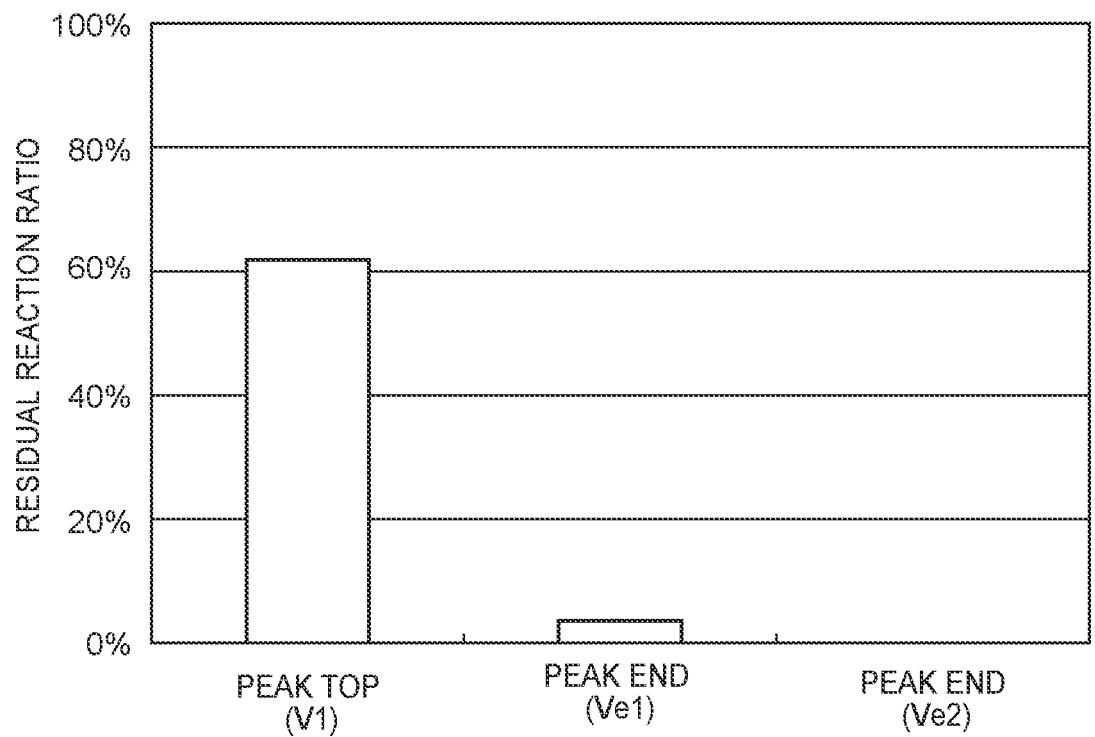
FIG. 17 is a drawing for a comparison between residual reaction ratios depending on the charging voltage.

FIG. 17 shows a residual reaction ratio in a case where the charging is performed twice. In FIG. 17, a value that is obtained by dividing an area of the differential capacity curve during the second charging by an area of the differential capacity curve during the first charging in FIGS. 14 to 16 is shown as the residual reaction ratio. In a case where the differential capacity curve of the first charging cycle and the differential capacity curve of the second charging cycle have no difference, the residual reaction ratio is 100%. The residual reaction ratio increases as the difference increases.

As illustrated in FIG. 17, the residual reaction ratio is as high as approximately 60% in the charging up to the first peak top voltage. The residual reaction ratio is 10% or less in the charging up to the first peak end voltage. In addition, the residual reaction ratio is almost 0% in the charging up to the second peak end voltage. As described above, the residual reaction ratio drops rapidly by the charging up to the peak end voltage. Accordingly, it is conceivable that the film can be appropriately formed when the initial charging is performed at a low current rate at the peak end voltage. When the specified voltage is set based on the peak end voltage as described above, the film can be further appropriately formed. In this embodiment, the CCCV charging is repeatedly performed in the first charging process. However, the CC charging may be performed with one specified voltage as in the second embodiment.

Figure 18:
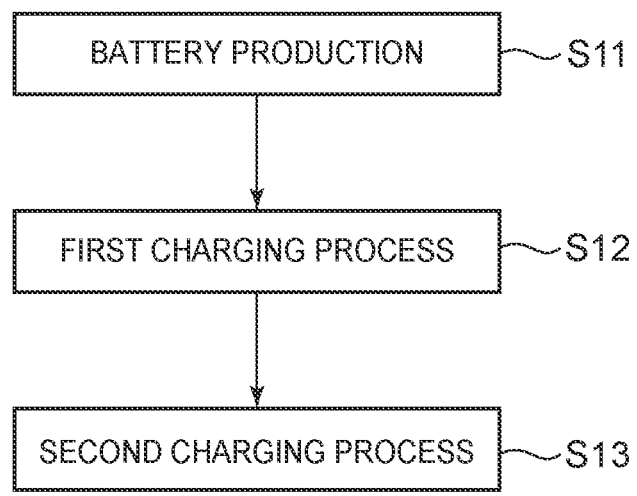
FIG. 18 is a flowchart illustrating a battery production method.

A production method for a lithium-ion battery according to an embodiment of the invention will be described below with reference to FIG. 18. Firstly, the battery is produced (S11). For example, the cell of the battery that is provided with the positive electrode, the electrolyte, and the negative electrode is produced. Herein, the materials that are described with regard to the first embodiment and the second embodiment can be used. Then, the first charging process of the initial charging is performed on the cells of the battery not subjected to the initial charging (S12). The battery is connected to a charging device to this end. The charging device charges the battery in accordance with the charging pattern determined in advance while monitoring the charging current and the charging voltage during the charging. In other words, the charging device charges the battery cell up to the specified voltage set based on the differential capacity curve.

After the first charging process, the second charging process is performed (S13). In other words, the battery cell is charged for full charging from the specified voltage at a high current rate. Any one of the charging patterns described with regard to the first to fifth embodiment can be employed for the first charging process and the second charging process. Then, an aging process, a self-discharging process, a shipping inspection process, and the like are carried out for the battery. The lithium-ion battery can be produced in this manner.

Figure 19:
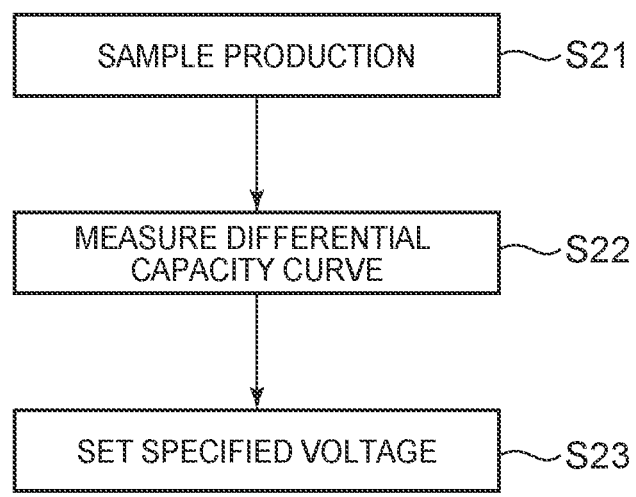
FIG. 19 is a flowchart illustrating a method for obtaining a specified voltage regarding the initial charging method for the battery.

A method for setting the specified voltage in the initial charging method according to the embodiments of the invention will be described with reference to FIG. 19. Firstly, a battery that has the same material configuration as the battery to be produced is produced as the sample for evaluation (S21). Herein, it is preferable that the sample is produced through the same production process as that for the battery produced in S11 illustrated in FIG. 18. In other words, a sample having the same material as a battery for mass production is produced.

Then, the differential capacity curve of the sample is measured (S22). The sample is connected to the charging device and is subjected to the CC charging. Then, the differential capacity curve illustrated in FIGS. 1 and 10 is acquired by the charging current and the charging voltage during the charging being monitored. As a matter of course, a plurality of the samples may be produced and charged at different current rates. In this manner, the differential capacity can be measured for each current rate. In addition, the differential capacity curve is measured for each material configuration of the battery subjected to the initial charging. This is because the specified voltage suitable for film configuration is different for each battery material.

Then, the specified voltage is set from the differential capacity curve (S23). The specified voltage defines a range of the voltage in which the film is formed by the initial charging. Herein, the specified voltage can be set based on the peak top voltage as illustrated in the first to forth embodiments. Alternatively, the specified voltage can be set based on the peak end voltage as illustrated in the fifth embodiment. The plurality of samples may be used at the same current rate in obtaining the differential capacity curve and an average value of the peaks may be obtained. In addition, the peak top voltage or the peak end voltage may be extracted by a user or automatically extracted by a computer.

In the case of the plurality of peak voltages as illustrated in the first and third embodiments, each may be the specified voltage. Alternatively, only one peak voltage may be the specified voltage as illustrated in the second and fourth embodiments. In this case, the specified voltage may be set based on the peak voltage with the highest voltage value. In addition, the specified voltage may be set based on the peak end voltage as well as the peak top voltage. Alternatively, any voltage ranging from the peak top voltage to the peak end voltage may be the specified voltage.

The differential capacity curve may be measured at a plurality of current rates. In this case, the peak can be reliably extracted even in the case of a differential capacity curve in which the peak is lowered from a certain current rate to be buried in the surrounding differential capacity. Then, after the setting of the specified voltage, the battery of the same material is subjected to the initial charging in accordance with the flow illustrated in FIG. 18. In this manner, the film can be appropriately formed even in the case of the charging at a high speed. Hence, a high-performance battery can be produced with a high level of productivity.

The invention is not limited to the embodiments described above and can be modified as appropriate.

What is claimed is:

1. An initial charging method for a lithium-ion battery comprising:
   preparing a cell having a positive electrode, a negative electrode, and an electrolyte; and
   charging the cell by using a plurality of voltages that are set based on a differential capacity curve showing an amount of a change in a capacity of the cell per unit voltage,
   wherein one of the plurality of voltages is set to a peak end voltage corresponding to a local minimum of the differential capacity curve.

2. The initial charging method according to claim 1, wherein the charging the cell comprises:
   performing a constant current constant voltage (CCCV) charging on the cell by using a highest voltage of the plurality of voltages that form the differential capacity curve showing the amount of the change in the capacity of the cell per unit voltage.

3. The initial charging method according to claim 1, wherein the charging the cell comprises:
   setting the plurality of voltages based on the differential capacity curve; and
   performing a CCCV charging by applying the plurality of voltages in order from a low voltage to a high voltage.

4. The initial charging method according to claim 1, further comprising:
   a first charging process of performing a constant current (CC) charging on the cell up to the voltage that is set to the peak end voltage; and
   a second charging process of charging the cell up to a full charge voltage at a current rate higher than a current rate of the CC charging in the first charging process, after the first charging process.

5. An initial charging method for a lithium-ion battery comprising:
   preparing a cell having a positive electrode, a negative electrode, and an electrolyte; and
   charging the cell by using a plurality of voltages that are set based on a differential capacity curve showing an amount of a change in a capacity of the cell per unit voltage,
   wherein one of the plurality of voltages is set to a peak top voltage corresponding to a local maximum of the differential capacity curve.

* * * * *